United States Patent

[11] 3,620,416

| [72] | Inventor | Fred W. Beutnagel<br>1952 Woodland, Sequin, Tex. 78155 |
|---|---|---|
| [21] | Appl. No. | 25,201 |
| [22] | Filed | Apr. 2, 1970 |
| [45] | Patented | Nov. 16, 1971 |

[54] SEWAGE CHLORINATOR
10 Claims, 4 Drawing Figs.

| [52] | U.S. Cl. | 222/59, 222/133 |
|---|---|---|
| [51] | Int. Cl. | B67d 5/08 |
| [50] | Field of Search | 222/57, 59, 133, 145, 395, 564; 137/205.5; 239/61, 407 |

[56] References Cited
UNITED STATES PATENTS

| 2,606,068 | 8/1952 | Bonacor | 222/133 X |
| 3,093,267 | 6/1963 | Lowery | 222/133 X |

*Primary Examiner*—Robert B. Reeves
*Assistant Examiner*—Larry Martin
*Attorney*—Schellin and Hoffman ABSTRACT: A device is provided in order to gradually add small quantities of an antiseptic solution, sodium hypochlorite for instance, to the overflow conduit from a septic tank, said conduit leading to an absorption field. The device operates to add the chlorinating fluid, for instance, only when there is a quantity of flowing sewage in the conduit leading to the said absorption field.

PATENTED NOV 16 1971 3,620,416

INVENTOR
FRED W. BEUTNAGEL

BY Schellin & Hoffman
ATTORNEYS 3,620,416

SEWAGE CHLORINATOR

BACKGROUND OF THE INVENTION

It will be appreciated that enormous efforts are currently being made to control the effluent being pumped into our immediate surrounding environment. Much activity has been undertaken to control the sewage flowing into streams and rivers. Some effort has also been made to control the flow of sewage in a highly localized area such as is found in conjunction with home septic tanks and absorption field units. Also, some commercial establishments have similar fields of a considerably larger nature. Additionally, it is a frequent practice to combine a septic tank with an absorption field for service to a number of homes in small environs.

It is known, of course, that a septic tank receives the liquid sewage, for instance, from a specific house. The tank is utilized as a means to accept the sewage and to retain it for purposes of anerobic digestion. The solid materials in the septic tank are permitted to settle to the bottom while the liquid, as the tank fills to a certain high level, is permitted to flow out over suitable weirs towards a series of porous pipes which are located underground in a field near the house and branch from the main conduit leading from the septic tank. The liquid, hopefully, is relatively clear and is permitted to flow into the ground through the openings provided in the pipe. The liquid emanating from the absorption field is dispersed by gravity through the field and settles downwardly through the earth.

As long as the earth is receptive to the effluent from the septic tank, there is no problem. However, when a combination of circumstances occur such as an overabundance of effluent and a prolonged rainy season, the earth surrounding the absorption field becomes unduly waterlogged so that the effluent actually may seep to the surface by means of capillary action. Inasmuch as the effluent contains an incredibly high bacteria count, it will be appreciated that the area around the absorption field becomes extremely dangerous from an epidemic-producing point of view as well as becoming unduly odoriferous. Often, also, the local health department will not approve the placement of a septic field in an area where the earth has a very low percolation rate due to rocky and/or clay soil conditions. In such a situation, the absorption field must be extremely large, if in fact it is permitted at all.

BRIEF DESCRIPTION OF THE INVENTION

Accordingly, in view of the difficulties as enumerated succinctly in the above, the present invention will be seen to obviate some of the problems attendant the utilization of an absorption field provided with effluent from a septic tank. In the present invention, an ingenious chlorinator is provided which includes a drip chamber for applying small increments of a liquid solution of sodium hypochlorite only when effluent is flowing through the pipe or conduit leading to an absorption field. The addition of the sodium hypochlorite achieves a partial or complete sterilization of the effluent so that in the event such effluent rises to the surface of the absorption field through the earth, the effluent will pose little or no danger to the environment and will also avoid the unpleasant stench sometimes associated with such a field.

DETAILED DESCRIPTION OF THE INVENTION

Figure 1:
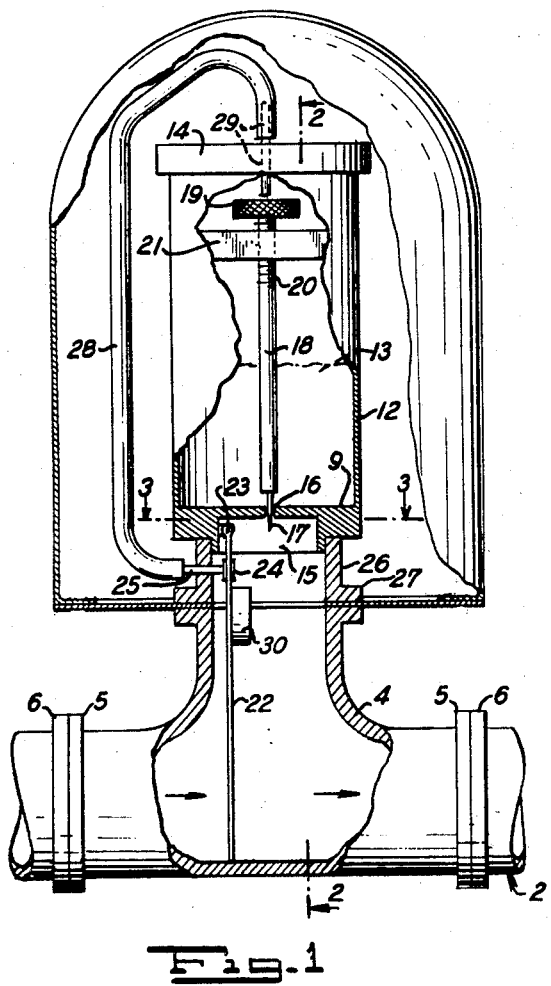
FIG. 1 is a side elevational view of the chlorinator of the present invention in partial cross section.

The chlorinator shown generally by reference numeral 1 is mounted on a main conduit 2 of the conduit leading from a septic tank, for instance, to an absorption field. The flow of effluent is shown by an arrow 3 in the main conduit 2. The chlorinator 1 is mounted on a tee 4 of said main conduit 2. The tee has the usual flanges 5 for abutment with flanges 6 of the remainder portions of main conduit 2.

The chlorinator 1 is positioned in a bell-shaped housing 11 which may be constructed of any suitable material such as steel and the like. Within housing 11 is a reservoir 12 which is set up to contain sodium hypochlorite solution 13, for instance. The reservoir 12 has a cylindrical configuration open at the top which is closed with a top closure 14 which seals in a suitable manner with said open portion of reservoir 12. Reservoir 12 terminates in a bottom 9 which has a downwardly facing recess 15. In the central portion of bottom 9 there is an aperture 16. Within the confines of the aperture 16 is a needle valve arrangement 17 which is mounted on the terminal portion of a rod 18 and terminates at the upper end with a horizontally disposed knurled wheel 19. Towards the upper portion of rod 18 is a threaded portion 20 which is threaded through suitable thread containing vertical aperture means in crossmember 21. Crossmember 21 holds the rod 18 in position. It will be appreciated that by grasping knurled wheel 19, it is possible to withdraw valve 17 from aperture 16, or to move it into seating position in order to prevent any of the liquid to flow through aperture 16. Depending from the recessed portion of the bottom 9 is a swing valve 22. The valve is suitably pivoted at 23 between the walls of the recess 15 (note FIG. 2 for a clearer view of this). The swing valve 22 is in a normal vertical position and has a sealing surface 24 in abutment with the opening end portion of horizontally positioned tube 25. The tube 25 is mounted to pass through a short vertical conduit 26 having a horizontally disposed flange 27. Tube 25 has its other end affixed to an elongated tube 28 which terminates at the top end of tube 29 which passes approximately centrally with respect to closure 14 so that tube 29 terminates at its other end in the upper portion of reservoir 12.

A weight 30 is positioned near the upper portion of swing valve 22 to insure that it will be in a normally vertical position, as is shown in FIG. 1.

Figure 2:
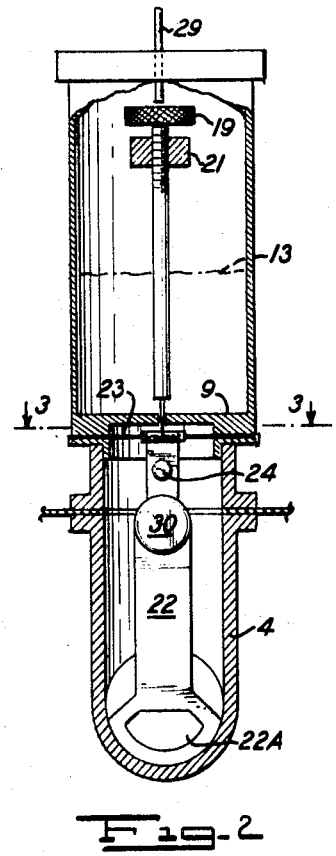
FIG. 2 is a cross-sectional view of the chlorinator of the present invention taken along lines 2—2 of FIG. 1.
Figure 4:
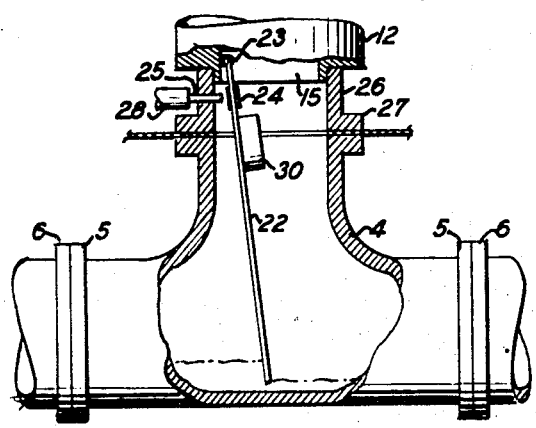
FIG. 4 is similar to FIG. 1 in a fragmentary condition showing the use of the chlorinator.
Figure 3:
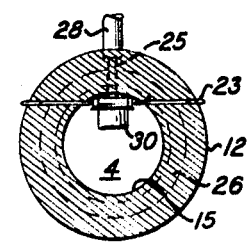
FIG. 3 is a cross-sectional view taken along lines 3—3 of FIG. 1.

The configuration of the swing valve 22 can be seen more readily from FIG. 2 where weight 30 is positioned and the pivot arrangement 23 is shown as an axle journaled through the bottom portion of housing 14 by drilling therethrough and then passing a wire axle from one side to the other. The swing valve 22 terminates in an arcuate bottom having the approximate configuration of the internal portion of the T-shaped conduit 4. The swing valve 22 also carries a hard plastic surface piece 22A as a protective means to the valve.

It will be appreciated that by maintaining the valve 17 in an almost closed position that an equilibrium point will be reached whereby a certain amount of the liquid 13 will drip through the aperture until a vacuum occurs above the surface of the liquid thereby preventing further egress of the liquid until air is provided to replace the vacuum as the upper portion of the reservoir is in a completely closed condition as long as the seat 24 is in abutment with the end of tube 25. The condition shown in FIG. 1 will remain undisturbed, as shown, until effluent from the septic tank, for instance, proceeds to flow towards the absorption field. As the swing valve 22 blocks the passage of the effluent, the effluent by its mass displaces the swing valve at its lower reaches to the right about the pivot 23. This movement then unseats member 24 from the end of tube 25 permitting air to move into reservoir 12 in order to permit displacement therefrom of the liquid through aperture 16. When no effluent is flowing through the tee conduit 4, the swing valve due to its weight 30 will return to the condition shown in FIG. 1.

It will be seen that the chlorinator 1 operates completely automatically once the needle valve 17 has been adjusted to provide for a tiny increment flow. The needle valve may be set from calibration charts empirically determined so that correct proportionate amounts of the chlorinating fluid may be released for a known average daily flow of sewage. Due to the automatic nature of the device herein disclosed, partial or nonuse of the system will, however, result in arresting the flow of the fluid through the needle valve by closing the swing valve which prevents venting of the reservoir 12.

In order to prevent corrosion of the parts both in association with the effluent from the septic tank and the chlorinating liquid, it has been found expedient to coat such exposed parts with a plastic material such as Teflon or to construct portions completely of plastic as is found desirable.

While there have been shown and described particular embodiments of the invention, it will be obvious to those skilled in the art that various changes and modifications may be made therein without departing from the invention, and, therefore, it is aimed to cover all such changes and modifications as fall within the true spirit and scope of the invention.

What is claimed is:

1. A device for dispensing upon demand a quantity of liquid antiseptic to a flowing stream of effluent comprising a housing, said housing adapted to be mounted about an aperture of a conduit, a reservoir for liquid antiseptic mounted within said housing, said reservoir having an aperture at the bottom thereof whereby the liquid antiseptic is dispensed therethrough downwardly through said aperture of said conduit and into said conduit, a vertically depending swing valve pivotally mounted at the bottom of said reservoir adapted to project through said aperture of said conduit and into therein, a tubular member, said swing valve being in abutment with one open end of said tubular member when said vane valve is in a normal position at a point below the pivot point of said swing valve to thereby seal said end of said tubular member, the other end of said tubular member terminating in the upper portion of said reservoir, said reservoir being capable of being sealed to the ambient except when the swing valve is in a nonnormal position, said nonnormal position being normally accomplished by impingement of said effluent on the lower portion of the vane valve as it flows in said conduit.

2. The device of claim 1 wherein the size of the aperture in the bottom of said reservoir is controlled by a needle valve.

3. The device of claim 1 wherein the bottom of said reservoir has a downwardly facing recess and the pivot point for said swing valve is mounted in said recess.

4. The device of claim 1 wherein the housing is bell shaped.

5. The device of claim 1 wherein the vane valve has a weight attached to the side opposite to the side that closes the said tubular member.

6. The device of claim 1 wherein the vane valve has a seat means capable to be in abutment with the end opening of said tubular member.

7. The device of claim 2 wherein the needle valve is mounted to the end of a vertical rod in said reservoir and said rod is adjustably mounted in means in said reservoir.

8. The device of claim 7 wherein the reservoir is sealed with a top closure.

9. The device of claim 8 wherein the other end of said tubular member passes through centrally with respect to said cap into said reservoir.

10. The device of claim 1 wherein the reservoir contains a solution of sodium hypochlorite and the device is mounted on a conduit intermediate a septic tank and a septic absorption field.

* * * * *